United States Patent

Hannan

[15] 3,647,945

[45] Mar. 7, 1972

[54] COLOR ENCODING SYSTEM UTILIZING TWO FILTERS ALTERNATELY FOR MINIMIZING EFFECTS OF IMAGE MISREGISTRATION AND IMAGE PICKUP DEVICE LAG

[72] Inventor: William James Hannan, Pennington, N.J.

[73] Assignee: RCA Corporation

[22] Filed: Sept. 30, 1969

[21] Appl. No.: 862,224

[52] U.S. Cl. ......................178/5.4 ST, 350/162 SF, 350/317

[51] Int. Cl. ......................................................H04n 9/06

[58] Field of Search..........178/5.4 ST; 350/316, 317, 162 SF

[56] References Cited

UNITED STATES PATENTS 3,378,633 4/1968 Macouski ........................350/162 SF

*Primary Examiner*—Robert L. Richardson
*Assistant Examiner*—Donald E. Stout
*Attorney*—Eugene M. Whitacre

[57] ABSTRACT

Apparatus is provided for enabling color images to be recorded on black and white motion picture film and subsequently displayed in full color on a television monitor. Different color-encoding filters yielding the same frequency color carrier waves having different phase relationships are moved into the optical path on alternate frames for producing color representative signals, which, when averaged over several horizontal scanning lines, reduce the undesirable effects of vidicon lag and frame-to-frame misregistration.

10 Claims, 5 Drawing Figures

INVENTOR.
WILLIAM J. HANNAN
BY Eugene M. Whitacre
Attorney

INVENTOR.
WILLIAM J. HANNAN
BY Eugene M. Whitacre
Attorney

COLOR ENCODING SYSTEM UTILIZING TWO FILTERS ALTERNATELY FOR MINIMIZING EFFECTS OF IMAGE MISREGISTRATION AND IMAGE PICKUP DEVICE LAG

BACKGROUND OF THE INVENTION

This invention relates to apparatus for minimizing the affects of misregistration of successive frames of a color-encoded motion picture film on a photosensitive medium used in a playback system for reproducing the colors.

It is known that spatial color filtering can be used to encode color images so they can be detected by or recorded on monochromatic photosensitive devices or media. For example, a spatial color-encoding filter may be placed in the optical path of a television camera pickup tube to project a color encoded image on the photosensitive element of the pickup tube such that when the photosensitive element is scanned by an electron beam, signals representative of several colors may be derived as amplitude and/or phase modulations of carrier waves.

One example of a spatial color-encoding filter which may be used to project a color-encoded image onto a photosensitive medium such as a television pickup tube or panchromatic film is disclosed in U.S. Pat. No. 3,378,633 granted to A. Macovski on Apr. 16, 1968. Macovski describes a filter comprising a first grating having alternate cyan and transparent stripes superimposed on and having its stripes angularly disposed 45° from alternate transparent and yellow stripes of a second grating, the stripes of both gratings having the same pitch. The cyan stripes encode minus red light and the yellow stripes encode minus blue light. The brightness of the scene is contained in the average transmission of the entire filter. The stripe pattern and scene are focused on a television pickup tube and, with the cyan-transparent grating disposed perpendicular to the direction of the horizontal scanning lines, the red scene light will be encoded as amplitude modulation of a first carrier wave and the blue scene light will be encoded as amplitude modulation of a second carrier wave of different frequency. The composite signal obtained from the pickup tube is applied to band-pass filters to separate the red and blue carrier waves and their respective sidebands and the luminance or brightness signal. It has been demonstrated in the past that this encoding method is satisfactory for encoding a still scene such as a colored film transparency.

However, there are problems encountered in encoding colored motion picture film in the above-described encoding method that are not present when a still scene is encoded, and which deleteriously affect the quality of the reconstituted motion picture image. The problems are encountered, for example, in a system in which color motion picture images are encoded as described above, to enable the information to be recorded on black and white film and subsequently played back by a television film camera for providing color representative signals for application to a color television picture tube.

Among the problems encountered with encoded motion picture films are those produced by the combined effects of frame-to-frame misregistration of the projected image on the photosensitive electrode of a television camera pickup tube and the lag inherent in presently made vidicon pickup tubes. Because of lag the signal from a vidicon does not correspond to the image from a single frame but rather to that from two or more frames. Depending on vidicon target illumination, target voltage and beam current, the undesirable signal contribution due to the vidicon lag can range from about 10 percent to 80 percent of the total signal amplitude. Therefore, signal contributions from preceding frames is far from insignificant. As a result, small frame-to-frame image displacements cause each color-modulated carrier wave to appear as a number of phase-displaced carrier waves. Addition of these randomly phased carrier waves leads to spurious amplitude modulation which causes either color flicker or complete loss of color in the picture displayed on a television monitor.

Misregistration of the successive encoded images on the photosensitive surface of a pickup tube, or in successive frames of encoded images that are recorded on black and white film (to be played back subsequently in a television system), causes color flicker or complete loss of color if the misregistration exceeds about one-tenth of the encoding stripe period. The stripe period is given by:

$$d = W/f\,t_h$$

where $W$ is the width of the vidicon raster, $f$ is the carrier frequency and $t_h$ is the active horizontal scan period. For example, in a system employing a vidicon pickup tube having a ½-inch wide photoconductor, and in which it is desired to encode a color as amplitude modulation of a 5 mHz. carrier wave, the stripe period $d$ will be 0.0019 inches. Since it is desirable to have the frame-to-frame misregistration less than one-tenth of this amount, the required registration accuracy is 0.00019 inches or 0.19 mils. Obviously, this degree of accuracy is difficult to achieve in a practical system.

An object of this invention is to provide an improved system for encoding color images onto a panchromatic black and white motion picture film.

Another object of this invention is to provide an improved color-encoded monochromatic film recording of color images.

Another object of this invention is to provide an improved system for deriving color and brightness representative signals from a color-encoded monochromatic motion picture film.

In one embodiment of the invention a system is provided for encoding successive image-bearing frames of color motion picture film onto black and white film to form a monochromatic record thereof. Color images from successive frames of the color motion picture film are encoded by a color-encoding filter assembly onto the black and white film which is advanced in synchronism with the color film. The color-encoding filter assembly comprises first and second striped spatial color-encoding filters, corresponding encoding stripes of the two filters being disposed at equal and opposite angles measured from a common reference axis in the plane of the filters, each filter being moved into the optical path during alternate film frame intervals.

In another embodiment of the invention, a system is provided for encoding a live color scene onto a black and white panchromatic motion picture film. The scene is imaged onto the encoding filter assembly described above and the two encoding filters are alternately moved into the optical path for encoding the scene onto the black and white film which is advanced frame by frame in synchronism with the movement of the encoding filters.

In another embodiment a system is provided for deriving color and brightness representative signals from a color-encoded monochromatic motion picture film. The encoded film images are projected onto the photosensitive electrode of an image pickup device. As the electrode is scanned by an electron beam a composite signal is derived from the pickup device, the signal including color representative information contained as modulation of a carrier wave. The electron beam of the pickup device is wobbled vertically to average the signals over several scanning lines to obtain a color signal with substantially no spurious modulation caused by frame-to-frame misregistration of the encoded film images on the photosensitive electrode and retention of an encoded image by the image pickup device for more than one scanning interval.

A more detailed description of the invention is given in the specification and accompanying drawings of which:

DETAILED DESCRIPTION OF THE INVENTION

Figures 1, 2A, 2B, 4:
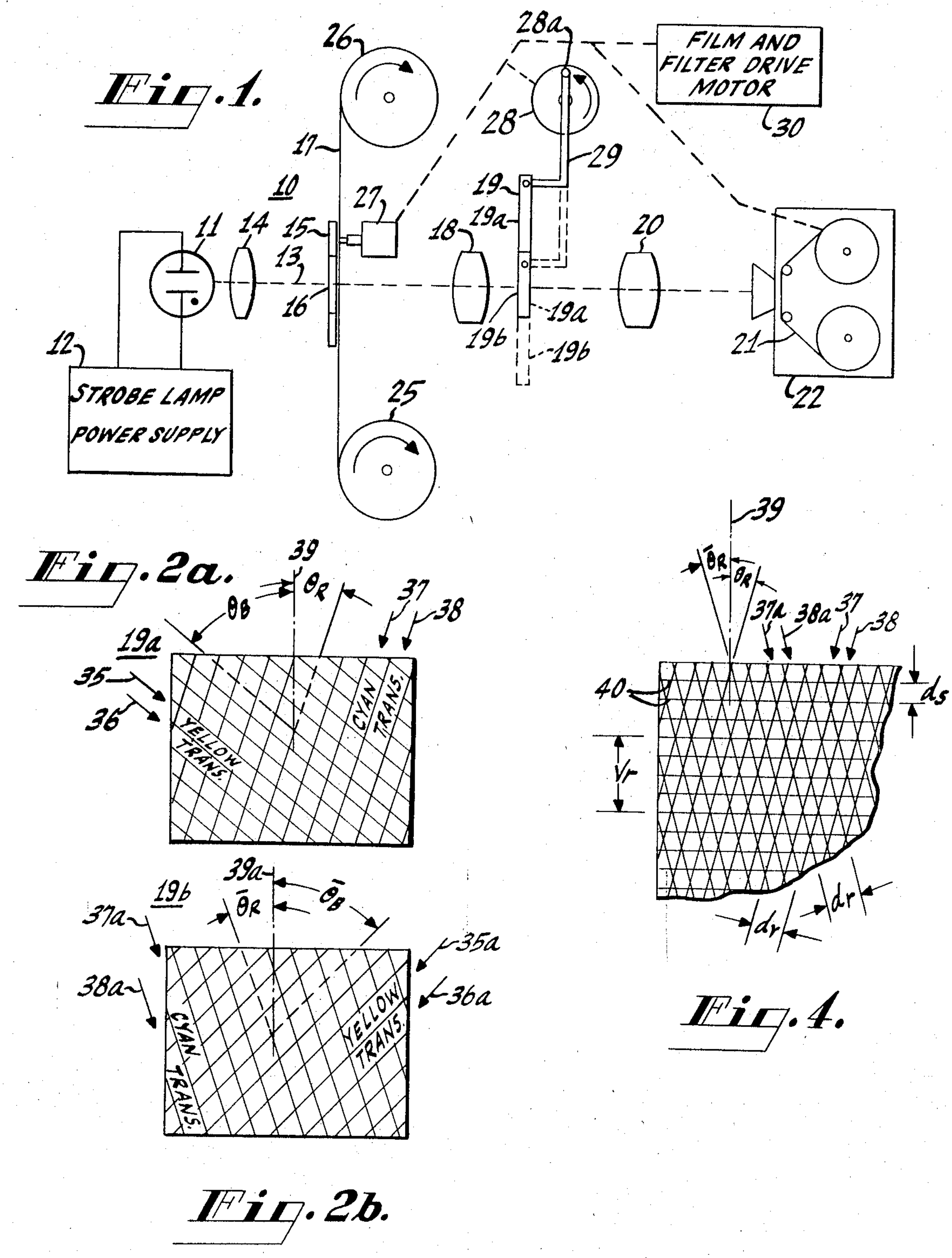
FIG. 1 is a functional diagram of a camera embodying the invention for encoding color motion picture films.
FIG. 2A and 2B is a plan view, not to scale, of the color-encoding filters utilized in the film camera of FIG. 1.
FIG. 4 illustrates the effects of two successive encoded film frames imaged onto the television camera pickup tube of FIG. 3.

FIG. 1 is a functional diagram of a camera 10 for encoding color motion picture film images onto successive frames of a black and white panchromatic motion picture film. A stroboscopic light source 11 is coupled to a strobe lamp power supply 12 for providing light to illuminate film. The light is collected by a collimating lens 14 and directed along an optical path 13. The light passes through an aperture 16 in a film gate 15 and through image-bearing frames of a colored motion picture film 17. The colored light from the successive frames of film 17 passes through a film objective lens 18 which in turn directs the light through a color-encoding filter assembly 19 to a relay lens 20. Relay lens 20 in turn images the encoded light onto a black and white film 21 in film camera 22 to form a monochromatic recording thereof.

Color motion picture film 17 is fed through film gate 15 from a film supply reel 25 and is taken up by a film reel 26. Color film 17 is moved across the aperture 16 by a film-moving mechanism 27 which is driven by a film and filter drive motor 30. Film-moving mechanism 27 may be any suitable known device for moving the film 17 through film gate 15 at an intermittent rate. Black and white film 21 in film camera 22 is advanced in synchronism with color film 17 on a frame-to-frame basis. Although not shown because it is not necessary for an understanding of the invention, conventional means are provided for synchronizing the triggering of stroboscopic light 11 with the movement of films 17 and 21.

Film and filter drive motor 30 is also mechanically coupled to a rotating member 28 having an actuating member 29 attached to it pivotally at a point 28*a* removed from its center axis such that rotation of member 28 provides a reciprocating motion of actuating member 29. Actuating member 29 is in turn connected to encoding filter assembly 19 in such manner that encoding filter assembly 19 is moved back and forth as member 28 is rotated.

Encoding filter assembly 19 comprises two adjacent encoding filters 19*a* and 19*b* which are alternately moved into the optical path 13 during successive film frame intervals by the reciprocating motion of actuating member 29, such that filter 19*a* is in the optical path for encoding an image on a first frame of films 21 and filter 19*b* is in the optical path for encoding the next succeeding frame. The rotation of member 28 is mechanically synchronized with the film-moving mechanism 27 such that each of encoding filters 19*a* and 19*b* is alternately moved into the optical path 13 during successive frames of color motion picture film 17. The solid lines of filter assembly 19 and member 29 indicate a first position of the apparatus in which encoding filter 19*b* is in the optical path and the dotted lines indicate a second position in which encoding filter 19*a* is in the optical path. Color encoding filters 19*a* and 19*b* will be described in detail in conjunction with FIGS. 2*a*, 2*b*, and 4.

The color-encoding camera illustrated in FIG. 1 utilizes a relay lens assembly 20 to image the encoded color images onto black and white film 21. It should be noted that the relay lens 20 may be eliminated by placing the color encoding filter assembly 19 in camera 22 in front of film 21. With such an arrangement the film objective lens 18 is arranged to focus the color film images onto both encoding filter assembly 19 and film 21, which essentially are in the same image plane. The encoded images will be formed on film 21 in the same manner as previously described.

A live encoding camera utilizing the invention may be constructed by eliminating the strobe lamp 11 and its power supply 12, collimating lens 14, color film 17 and the color-film-advancing apparatus. Objective lens 18 may focus a live scene onto color-encoding filter assembly 19 and the colored light from the live scene may be encoded in a manner similar to the colored light from a color film. The live camera may be constructed with or without the relay lens assembly as described above.

FIGS. 2*a* and 2*b* illustrate encoding filters 19*a* and 19*b*, respectively, which make up color-encoding filter assembly 19 of FIG. 1. The encoding filters shown in FIGS. 2*a* and 2*b* may be of the general type described in the previously mentioned Macovski patent. It is to be understood that the encoding filters described are illustrative and not drawn to scale, and that any type of striped color encoding filter may be utilized.

Figure 3:
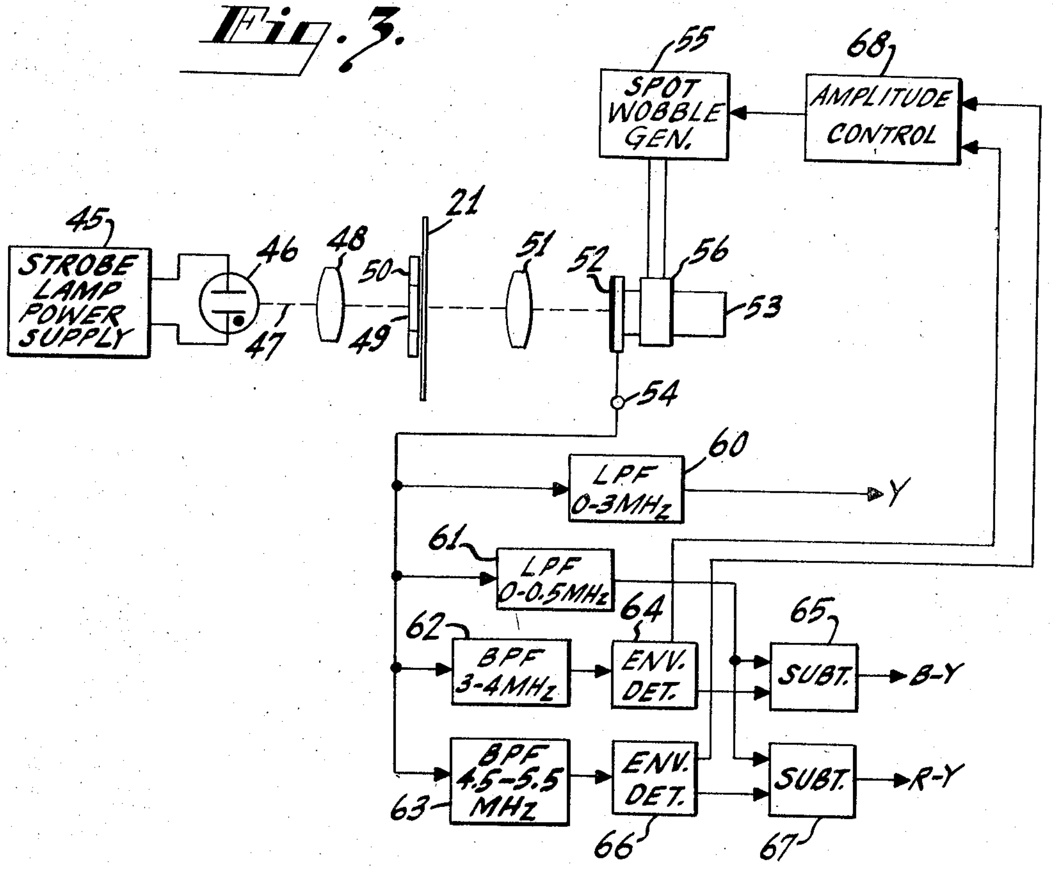
FIG. 3 is a schematic diagram, in block form, of a color television film camera which may be utilized for playing back the encoded film produced by the encoding camera illustrated in FIG. 1.

In FIG. 2*a*, encoding filter 19*a* comprises a first grating of alternate yellow and transparent stripes indicated by the arrows 35 and 36, respectively, superimposed over a second grating of alternate cyan and transparent stripes indicated by the arrows 37 and 38, respectively. The yellow stripes block blue light and pass all other colors and the cyan stripes block red light and pass all other colors. The yellow stripes are disposed at an angle $\theta_B$ extending from a reference line 39 and the cyan stripes are disposed at an angle $\theta_R$ extending from reference line 39. In a preferred embodiment the angle $\theta_R$ may be 50°, for example, and the angle $\theta_R$ may be 17°. The carrier frequency representative of blue light encoded by the yellow-transparent stripes 35 and 36 onto black and white film 21 and generated as the image of black and white film 21 projected onto a photosensitive electrode of an image pickup tube is scanned by an electron beam in a playback system to be described in conjunction with FIG. 3, is obtained from the relationship:

$$(1) \qquad f_b=(W/d_b\, t_h)\cos\theta_B$$

in which $W$ equals the width of the encoded image focused onto the scanned raster, $d_b$ equals the width of the yellow-transparent stripe pair and $t_h$ equals the horizontal scanning interval. The width $d_b$ of the yellow-transparent stripe pair is selected such that with a raster width $W$ of 0.5 inches, an active scanning time $t_h$ of 53 microseconds and the angle $\theta_B$ selected as 50°, $f_b$ is equal to 3.5 mHz.

The carrier frequency representative of red light may be determined by substituting the appropriate information into formula 1. For example, by selecting a desired red carrier frequency of 5 mHz., and $\theta_R$ equal to 17°, the width of a cyan-transparent stripe pair is determined.

The luminance or brightness signal is contained in the average transmission of filter 19*a*. Thus, when filter 19*a* is in the optical path 13 colored light from the frames of motion picture film 17 is encoded and imaged onto black and white film 21 of camera 22 such that during subsequent scanning in a playback system a composite signal containing a brightness representative component and encoded red and blue light representative signals at 5 and 3.5 mHz., respectively, is obtained from the pickup tube.

FIG. 2*b* illustrates encoding filter 19*b* of FIG. 1. The operation of encoding filter 19*b* is the same as encoding filter 19*a* described above. Encoding filter 19*b* differs from filter 19*a* in that cyan and transparent stripes 37*a* and 38*a*, respectively, are disposed at an angle $\bar{\theta}_R$ measured from a reference line 39*a* extending in a direction opposite to $\theta_R$ of FIG. 2*a*, and yellow and transparent stripes 35*a* and 36*a*, respectively, are disposed at an angle $\bar{\theta}_B$ from reference line 39*a*, extending in the opposite direction of angle $\theta_B$ of FIG. 2a. The absolute values of $\theta_B$ and $\bar{\theta}_b$ are the same; likewise, the values of angles $\theta_R$ and $\bar{\theta}_R$ of FIGS. 2*a* and 2*b* are the same. Thus, when scanned as described above, the red and blue carrier waves produced by both encoding filters 19*a* and 19*b* have the same frequency. As previously mentioned, gratings 19*a* and 19*b* are alternately moved into optical path 13 during successive frames of film 17. The difference in the signals produced by gratings 19*a* and 19*b* is that the phase of the respective red and blue color representative carrier waves will be different.

The considerations in selecting particular angles $\theta_R$, $\bar{\theta}_R$, $\theta_B$, $\bar{\theta}_B$, and particular widths $d_r$ and $d_b$ for the cyan-transparent and yellow-transparent stripe pairs will be discussed subsequently.

FIG. 3 illustrates a color television film camera which may be utilized for playing back the black and white film 21 of FIG. 1 for producing color representative signals suitable for application to a color television picture tube for reproducing the encoded images in their original color.

A stroboscopic light source 46 is operated at a television field scanning rate by its associated power supply 45. The light from the stroboscopic light 46 is directed along an optical path 47 and is collimated by a collimating lens 48. The collimated light is directed through an aperture 49 in a film gate assembly 50 to illuminate black and white encoded film 21. Film 21 is a type produced by the encoding system described in conjunction with FIG. 1. The monochromatic images from the frames of film 21 are focused by film objective lens 51 onto a photosensitive electrode 52 of a television camera image pickup tube 53. Pickup tube 53 may be a vidicon having its electron beam scanned over the target at the television line and field scanning rates. A spot wobble generator 55 is coupled to an auxiliary vertical deflection winding 56 for wobbling the electron beam of pickup tube 53 in a manner to be described subsequently.

As the electron beam of pickup tube 53 scans the target, a composite signal is obtained at output terminal 54. The composite signal includes the two color carrier waves and their associated sidebands and a brightness signal. The composite signal is coupled to a low-pass filter 60 which limits the brightness or luminance signal to 3 mHz. so that the color carrier waves will not be present. The composite signal is also coupled to a low-pass filter 61 for forming a luminance signal and to band-pass filters 62 and 63 for separating the 3.5 mHz. blue and the 5.0 mHz. red color carrier waves, respectively, and their associated sidebands.

The blue and red carrier waves are coupled to envelope detectors 64 and 66 respectively, and the detected blue and red signals are coupled to subtractors 65 and 67, respectively.

The 500 kHz. luminance signal from filter 61 having the same bandwidth as the detected blue and red color signals is coupled to subtractors 65 and 67 where it is combined with the respective blue and red signals to form B-Y and R-Y color difference signals. The color difference signals and the luminance signal may be applied directly to a color television receiver or they may be processed in a colorplexer for transmission over the air or cable.

As previously described, in a color television motion picture film system utilizing a single color-encoding filter to encode color images on black and white film, the combined effects of vidicon lag and frame-to-frame misregistration of the encoded image in the playback system results in spurious modulation of the encoded signal in each frame caused by the addition of the remaining signal from previous frames to the signal in the presently scanned frame. This spurious modulation results in color flicker or complete loss of color in the reproduced image displayed on a color television picture tube.

FIG. 4 illustrates the effects of two successive encoded film frames imaged onto the photosensitive electrode of the television camera image pickup tube shown in FIG. 3. As mentioned previously, this effect is caused by vidicon lag which results in the image of a first scanning interval being retained during the next succeeding scanning interval. Thus, a pattern of cyan and transparent stripe images 37 and 38 from a first scanning interval is retained during the next scanning interval when cyan and transparent stripe images **37*a* and 38*a* are focused onto the photosensitive electrode. Thus, the signal derived from the image pickup tube during any scanning interval will be a composite signal containing information from a first film frame interval and a next succeeding film scanning interval. The width of both cyan-transparent stripe pairs 37–38 and 37*a*–38*a* is $d_r$. For illustrative purposes only, the effect of the cyan-transparent stripes of the two encoding filters 19*a* and 19*b* will be described. It is to be understood that along with the cyan-transparent stripe pattern, the yellow-transparent stripe pattern of the two filters 19*a* and 19*b* are also encoded on black and white film 21** and present on the scanned raster. The stripe pattern is modulated by light from the original scene. The effect of the two cyan-transparent stripe images is similar to the effect produced by the two yellow-transparent stripe images.

Indicated in FIG. 4 are horizontal scanning lines 40 representative of the lines in a scanned television raster. Inspection of FIG. 4 shows that for the particular angles $\theta_R$ and $\bar{\theta}_R$ the cyan-transparent stripe pairs have a width $d_r$. The phase of the red color carrier wave will change in successive horizontal scanning lines 40 due to the inclination of the stripes to reference line 39. As mentioned above, the imaged stripe pattern includes the imaged stripes 37–38 from a first film frame retained by the image pickup tube and the stripes **37*a*–38** of a next succeeding film frame.

As the pattern is scanned, the phase of the red carrier for successive scanning of a given line may be the same, but differs by increasing amounts for successive scannings of succeeding lines. The vertical distance which is required for the phase of the red carrier on successive scanning lines to become the same again or to undergo a complete cycle of phase change is indicated in FIG. 4 as $V_R$. The vertical distance for a one-cycle change in the red carrier wave is given by the formula:

$$v_r = d_r/2\sin\theta_R \qquad (2)$$

As derived from formula 1, $d_r$ is equal to approximately 0.0018 inches. Substituting this value in formula 2, $v_r$ is determined to be about 0.00306 inches.

In a 525 scanning line per frame television system, having about 490 active scanning lines, the distance $d_s$ between scanning lines on a 0.375-inch high by 0.5-inch wide raster is equal to 0.375/490 or about 0.000765 inches. The number of scanning lines it takes the red color carrier wave to complete a one-cycle phase change as the combined retained stripe pattern of a first frame and the stripe pattern of the next succeeding frame as scanned is expressed by the formula:

$$n_r = v_r/d_s = d_r/2d_s\sin\theta_R \qquad (3)$$

Substituting the value for $v_r$ obtained from formula 2, with $\theta_R$ equal to 17°, $n_r$ is equal to 4.03 lines. Thus, the red picture components average to the correct value in approximately four scanning lines.

The above description of the phase change of the red carrier wave holds true for both of the gratings **19*a* and 19*b*. However, as indicated by the opposite angles of inclination of the stripes of encoding filters 19*a* and 19*b* in FIG. 4** the phase relationship of the red wave produced by one encoding filter is different from that of the carrier wave produced by the second encoding filter. Thus the red color representative signal from a first frame is purposefully misregistered in phase from the signal of a next frame to the extent that the retained signal from the first frame is cancelled by the signal of the next scanned frame when the signals are averaged over four scanning lines.

The effect of purposefully misregistering the phase of the blue color representative signal on succeeding frames is similar to that described for the red signals. The angles $\theta_B$ and $\bar{\theta}_B$, selected to be equal to 50° for the yellow-transparent stripe pairs allow blue signals to be averaged over approximately a two scanning line interval, that being the distance over which the blue color carrier wave undergoes a complete cycle of phase change as the combined stripe pattern of a first and next succeeding frame interval is scanned.

The consequences of color-averaging of a number of scanning lines would not be too noticeable with noninterlaced scanning; but with interlaced scanning interline color flicker is a potential problem, the amount of flicker depending on color structure of the film frame image, randomness of the frame-to-frame registration errors and number of television fields per picture frame (e.g., for a 20 frame per second film rate in a television system having a 60 field per second field rate there would be three television fields per picture frame).

As previously mentioned, a simple way to eliminate interline color flicker is to use the well-known spot wobble method. In the described embodiment, wobbling the vidicon beam vertically over a distance of four television scanning lines at a frequency higher than twice the highest color carrier frequency eliminates flicker. Spot wobble apparatus may be, for example, such as that described in U.S. Pat. No. 2,899,495 granted to W. G. Gibson and A. C. Schroeder on Aug. 11, 1959. This patent describes how an oscillator having at least twice the frequency at the highest video information content may be coupled to an auxiliary vertical deflection coil disposed around the pickup tube to wobble the electron beam at the frequency of the spot wobble oscillator. In the described embodiment, the highest color carrier wave is 5 mHz., therefore, the spot wobble oscillator 55 of FIG. 3 may be operated at a frequency of 10 mHz. The 10 mHz. oscillations are coupled to the auxiliary vertical deflection coil 56 to wobble the electron beam and average the signals over four scanning lines.

Use of spot wobble will somewhat reduce vertical resolution. It has been determined that this loss of vertical resolution does not result in an unsatisfactory television picture. However, the loss of vertical resolution may be minimized by taking advantage of the fact that spot wobble is needed only when the color carriers are present. By making the magnitude of the spot wobble proportional to the amplitude of the detected color carriers, vertical resolution is reduced only in those areas where flicker could occur. For example, as shown in FIG. 3 the detected color carrier waves obtained from envelope detectors 64 and 66 are coupled to an amplitude control circuit 68 for controlling the amplitude of the oscillations of spot wobble generator 55.

There is some freedom in the choice of the angles at which the encoding stripes lie in relation to the horizontal scanning lines, or, as described in conjunction with FIGS. 2 and 4, in relation to a reference axis line 39 (or 39*a*) perpendicular to the scanning lines. In the described embodiment, it was desired to have the red and blue carrier waves at 5 mHz. and 3.5 mHz., respectively, utilizing cyan-transparent and yellow-transparent gratings having about 554 and 578 stripe pairs per inch, respectively, measured in a direction perpendicular to the length of the stripes. Therefore, from formula 1, it follows that $\theta_R$ must be 17° and $\theta_B$ must be 50°. A further criterion is that any beat frequency between the color carriers lie outside of the luminance or brightness signal band pass. For the selected angles and stripe pair density in the described embodiment, the lowest potential beat frequency is 3 mHz. Therefore, the luminance signal may be contained in a 0 to 3 mHz. bandwidth and be free of this beat frequency. If desired, other angles may be selected for $\theta_R$ and $\theta_B$ and other stripe pair line densities may be selected to satisfy any particular design criteria.

What is claimed is:

1. A film recording system in which successive image-bearing frames of color motion picture film are color encoded by a spatial color encoding filter assembly onto black and white panchromatic film disposed in an optical path of said filter assembly for forming black and white images thereon comprising:
   - first and second spatial color-encoding stripe filters disposed between said color motion picture film and said black and white panchromatic film, each of said filters having a pattern of stripes for encoding said colored light, corresponding stripes of each of said filters being disposed at equal and opposite angles measured from a reference line in the plane of said filters; and
   - means for alternately moving said first and second filters into the optical path of said film system for encoding successive film frame images.

2. A system for encoding colored light from a scene onto black and white panchromatic film for forming a monochromatic recording thereon, comprising:
   - striped spatial color-encoding filter means disposed along an optical path between said scene and said film for encoding colored light from said scene onto said black and white panchromatic film, said color-encoding filter means including first and second color-encoding filters, each filter having a pattern of stripes for encoding at least two component colors and a brightness component of said scene, corresponding stripes of each of said filters being disposed at equal angles extending in opposite directions measured from a reference line in the plane of said filters; and
   - means for alternately moving said first and second filters into said optical path for encoding successive images of said scene onto said film.

3. A camera for encoding colored light from a scene onto black and white panchromatic film for making monochromatic recordings of said encoded light thereon in a series of successive film frames, comprising:
   - means for directing light from a scene along an optical path onto black and white panchromatic film;
   - a striped spatial color-encoding filter assembly disposed adjacent said optical path for encoding said colored light from said scene, said filter assembly including first and second striped spatial color-encoding filters, said filters having a pattern of different colored stripes for encoding a plurality of colors, corresponding stripes of both said filters for encoding a particular colored light having equal pitches, said stripes of said first filter for encoding a particular color being disposed at an angle from a reference line in said filter, said angle being equal to but measured in the opposite direction from the angle of said stripes of said second filter for encoding said particular color measured from a corresponding reference line in said second filter; and
   - means for alternately moving said first and second filters into said optical path during successive film frame intervals.

4. A color-encoding film camera according to claim 3 wherein both of said filters include a first set of encoding stripes for encoding a first color disposed at equal and opposite first angles measured from said reference lines and a second set of encoding stripes for encoding a second color disposed at equal and opposite second angles measured from said reference lines.

5. A color encoding film camera according to claim 4 wherein said first set of stripes comprises alternate cyan and transparent stripes for encoding red light and said second set of stripes comprises alternate yellow and transparent stripes for encoding blue light, and wherein the average light transmission of said filters is representative of the brightness of said scene.

6. A system for producing color representative video signals and a brightness signal from monochromatic motion picture film containing successive frames of encoded color representative images of a colored scene, said monochromatic color representative images being encoded on first frames of said film by a first spatial striped color-encoding filter and on second frames of said film alternating with said first frames by a second spatial striped color-encoding filter, said filters having corresponding sets of encoding stripes of different colors for encoding a plurality of colors, a set of stripes of said first filter for encoding a particular color being disposed at an angle measured in one direction from a reference line and a corresponding set of stripes of said second filter being disposed at said same angle measured in the other direction from said reference line, comprising:
   - a light source;
   - means for directing light from said source to illuminate said monochromatic film recording and to focus said film images onto a photosensitive electrode of an image pickup tube;
   - means coupled to said pickup tube for deriving a signal representative of the brightness of said scene;
   - means coupled to said pickup tube for deriving signals representative of the colors of said scene;
   - means coupled to said brightness signal and said color representative signals for producing first and second color difference signals representative of said color of said encoded images; and
   - electron beam wobbling means coupled to said image pickup tube for wobbling electron beam of said tube vertically over several horizontal scanning lines for averaging the signals derived therefrom.

7. A system for producing color representative video signals and a brightness signal from monochromatic motion picture film according to claim 6 wherein said electron beam wobbling means includes a spot wobble generator coupled to said image pickup tube for wobbling said beam at the rate of said generator; and means coupled to said spot wobble generator and to said means for deriving signals representative of the colors of said scene for causing said spot wobble generator to wobble said beam only when said color representative signals are present.

8. A system for producing color representative video signals and a brightness signal from monochromatic motion picture film according to claim 7, wherein said means for deriving signals representative of the colors of said scene includes first and second band-pass filters for deriving signals representative of first and second colors, respectively; and first and second detectors coupled to said first and second band-pass filters for detecting said first and second color representative signals.

9. A system for producing color representative video signals and a brightness signal from monochromatic motion picture film according to claim 8, wherein said means for deriving a brightness representative signal includes a low-pass filter having a pass band for frequencies below the frequency pass band of first and second band-pass filters.

10. A color-encoded black and white panchromatic motion picture film having successive image-bearing frames on each of which is encoded information including luminance and chrominance components of a scene, said components being encoded on said frames by first and second spatial striped color encoding filters, first frames of said film containing images encoded by said first encoding filter and second frames of said film alternating with said first frames containing images encoded by said second encoding filter, said first and second frames respectively having encoded thereon information passed by said first and second striped color-encoding filters, said information being contained on said first and second frames as a pattern of stripes modulated by two color components and a brightness component, said first frames containing a pattern corresponding to the stripes of said first filter and being inclined at a predetermined angle measured in a first direction from a common reference line in the plane of said film and said second frames containing a pattern corresponding to the stripes of the second filter and being inclined at said predetermined angle measured in a direction opposite to said first direction from said reference line.

* * * * *